(12) United States Patent
Kang et al.

(10) Patent No.: US 7,400,468 B2
(45) Date of Patent: Jul. 15, 2008

(54) VIBRATION DETECTOR FOR HARD DISK DRIVES

(75) Inventors: Chang-Ik Kang, Fremont, CA (US); Yunfeng Li, Fremont, CA (US); Bong-Jin Lee, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/603,370

(22) Filed: Nov. 22, 2006

(65) Prior Publication Data
US 2008/0117540 A1 May 22, 2008

(51) Int. Cl.
G11B 5/596 (2006.01)
(52) U.S. Cl. .................... 360/77.02; 360/75; 360/77.08
(58) Field of Classification Search .................. None
See application file for complete search history.

(56) References Cited

U.S. PATENT DOCUMENTS

| | | | | |
|---|---|---|---|---|
| 5,229,896 A | * | 7/1993 | Tohyama et al. | 360/78.04 |
| 6,097,565 A | * | 8/2000 | Sri-Jayantha et al. | 360/78.09 |
| 7,292,403 B2 | * | 11/2007 | Baek et al. | 360/77.02 |
| 7,319,570 B2 | * | 1/2008 | Jia et al. | 360/77.02 |
| 2007/0064334 A1 | * | 3/2007 | Jia et al. | 360/77.02 |

* cited by examiner

Primary Examiner—Hoa T. Nguyen
Assistant Examiner—James L Habermehl
(74) Attorney, Agent, or Firm—Ben J. Yorks; Irell & Manella LLP

(57) ABSTRACT

A hard disk drive with a circuit that provides a control signal to a voice coil motor to move a head across a disk. The disk drive includes a circuit that provides a control signal to the voice coil motor to move the head. The circuit also has a state predictor and an inversion filter that compute a vibration estimate used to detect a vibration in the drive. When a threshold vibration is detected a vibration estimate is combined with the control signal to compensate for the vibration. The circuit detects the vibration without the need for an accelerometer or other sensor.

16 Claims, 4 Drawing Sheets

VIBRATION DETECTOR FOR HARD DISK DRIVES

BACKGROUND OF THE INVENTION

1. Field of the Invention

The present invention relates to detecting vibration within a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

Disk drives typically employ a servo to maintain the heads on the centers of the tracks. Deviations from the track center line may create errors in the reading and/or writing of data. The drive may be subjected to vibration. For example, disk drives have a spindle motor that rotates the disks relative to the heads. Rotation of the spindle motor may create a vibration that is transmitted through the drive.

Some disk drives contain an accelerometer that detects the presence of vibration. The output of the accelerometer is fed to the servo system which then compensates for the vibration. The inclusion of an accelerometer increases the cost and complexity of mass producing disk drives. It would be desirable to detect vibration without an accelerometer.

BRIEF SUMMARY OF THE INVENTION

A hard disk drive with a circuit that provides a control signal to a voice coil motor to move a head across a disk. The disk drive includes a circuit that provides a control signal to the voice coil motor to move the head. The circuit also includes a state predictor and an inversion filter that compute a vibration estimate used to detect a vibration.

DETAILED DESCRIPTION

Described is a hard disk drive with a circuit that provides a control signal to a voice coil motor to move a head across a disk. The disk drive includes a circuit that provides a control signal to the voice coil motor to move the head. The circuit also has a state predictor and an inversion filter that compute a vibration estimate used to detect a vibration in the drive. When a threshold vibration is detected the vibration estimate is combined with the control signal to compensate for the vibration. The circuit detects the vibration without the need for an accelerometer or other sensor.

Figure 1:
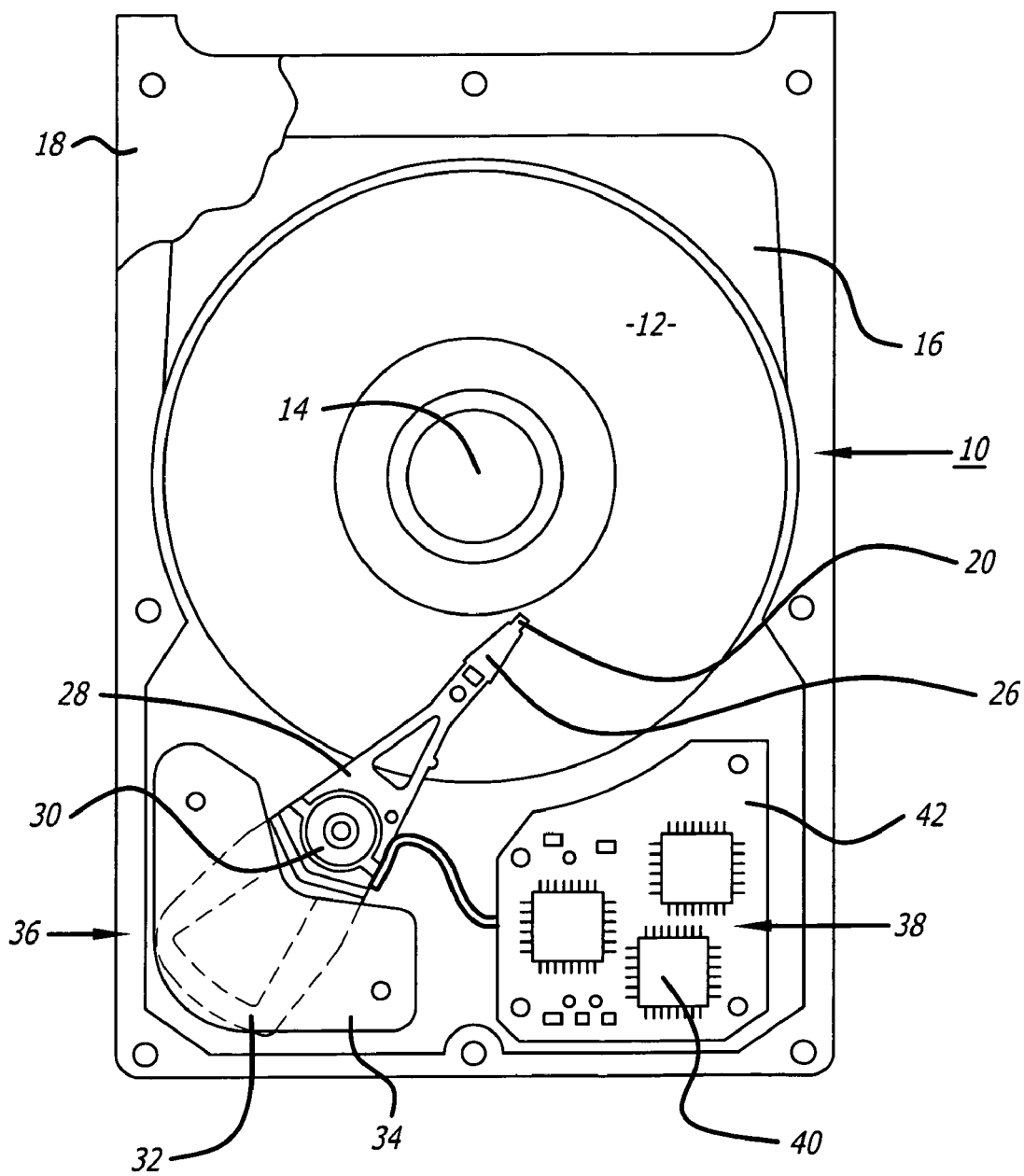
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 2:
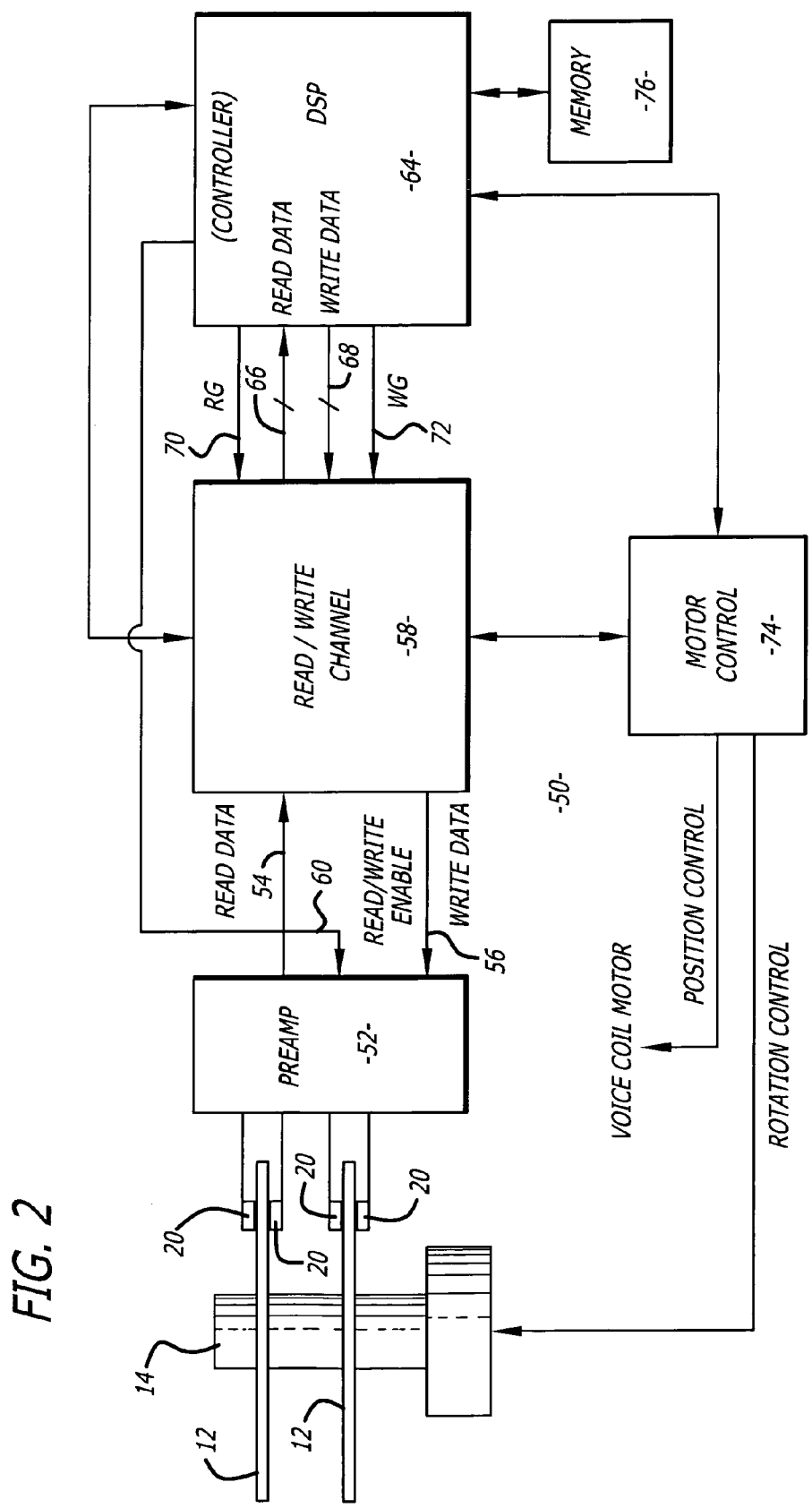
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read-only-memory ("ROM") that contains instructions that are read by the controller 64.

Each sector of a disk track typically has servo bits A, B, C and D. The controller 64 may operate a servo routine utilizing the servo bits to position the head relative to the track. The head is moved in accordance with a position error signal ("PES"). The PES reflects the difference between a target position and the actual position of the head.

Figure 3:
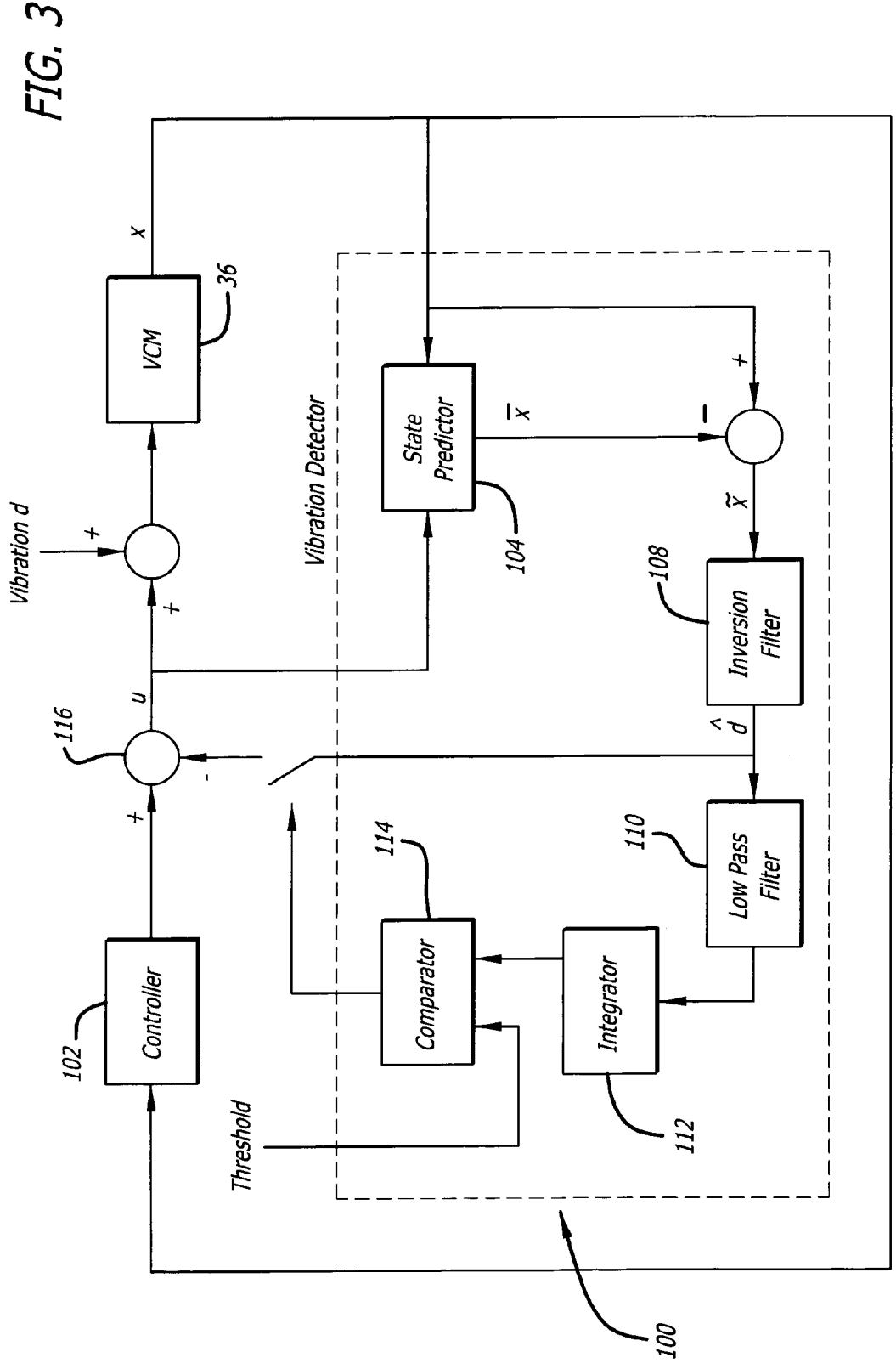
FIG. 3 is a schematic of a servo for the hard disk drive.

FIG. 3 shows a schematic of a servo system 100 used to control the position of the heads. The servo is typically performed by the controller 64. The servo system 100 includes a controller 102 that computes a control signal u. The control signal u is provided to the voice coil motor 36 to move the heads. The position of the heads x is provided back to the controller 102. The introduction of vibration d in the disk drive is shown schematically as being combined with the control signal u.

The head position x is also provided to a state predictor 104. The predictor 104 also receives the control signal u and computes a predicted position of the head at a next state $\bar{x}$. The predicted state $\bar{x}$ is combined with the head position x by adder 106. The output of the adder 106 $\tilde{x}$ is provided to an inversion filter 108. The inversion filter computes a vibration estimate $\hat{d}$.

The vibration estimate $\hat{d}$ can be filtered by a low pass filter 110 and integrated by an integrator 112. The integrated filtered vibration estimate $\hat{d}$ is provided to a comparator 114. The comparator 114 compares the integrated vibration estimate $\hat{d}$ with a threshold. If the vibration estimate exceeds the threshold the estimate is combined with the control signal u by adder 116. The inversion filter 108 and low pass filter 110 can be designed in accordance with the following equations and derivations.

Neglecting the high-frequency flexible modes, the voice coil motor may be described with have the following dynamic model:

$$\ddot{x} = \dot{v} = K_a(u+d) \tag{1}$$

The constant $K_a$ represents the acceleration constant of the actuator. The variables x and v represent head position and head velocity, respectively. The variables u and d represent the control input and the external vibration disturbance, respectively. The discrete equivalent to the continuous-time system can be described by:

$$x(n+1) = A_p x(n) + B_p u(n) + B_p d(n)$$

$$x(n) = C_p x(n) \tag{2}$$

State vector x, system matrix A, column vectors B, row vector C are defined by:

$$x(n) = \begin{bmatrix} x(n) \\ v(n) \\ u(n-1) + d(n-1) \end{bmatrix} \quad A_p = \begin{bmatrix} 1 & T_s & K_a(T_s - T_d)^2/2 \\ 0 & 1 & K_a(T_s - T_d) \\ 0 & 0 & 0 \end{bmatrix} \tag{3}$$

$$B_p = \begin{bmatrix} K_a(2T_s - T_d)T_d/2 \\ K_a T_d \\ 1 \end{bmatrix} \quad C_p = \begin{bmatrix} 1 \\ 0 \\ 0 \end{bmatrix}^T$$

The constants $T_s$ and $T_d$ are sampling period and control delay, respectively.

It is desirable to have a state predictor 104 that predicts head position from the control signal u and the measured head position x. A current state estimator can be introduced, which responds quickly to unknown disturbances.

$$\bar{x}(n+1) = A_p \hat{x}(n) + B_p u(n) \tag{4}$$

$$\hat{x}(n) = \bar{x}(n) + L_p[x(n) - C_p \bar{x}(n)] \tag{5}$$

$\bar{x}$ is the prediction vector and $\hat{x}$ is an intermediate vector used for purposes of implementation. $L_p$ is a feedback gain vector. It can be shown that unknown disturbance can be estimated from a prediction error. Combining equations (4) and (5) together and using equation (2) yields the following prediction vector:

$$\bar{x}(n+1) = A_p \bar{x}(n) + B_p u(n) + A_p L_p C_p [x(n) - \bar{x}(n)] \tag{6}$$

Defining the prediction error vector as $\tilde{x}(n) = x(n) - \bar{x}(n)$ and then subtracting equation (6) from equation (2), provides a prediction error dynamics equation:

$$\tilde{x}(n+1) = (A_p - A_p L_p C_p)\tilde{x}(n) + B_p d(n) \tag{7}$$

A transfer function from disturbance d to a scalar prediction error $\tilde{x}(n) = C_p \tilde{x}(n)$ can be described as:

$$H_{d2pe}(z) = \frac{\tilde{x}(z)}{d(z)} = C_p[zI - (A_p - A_p L_p C_p)]^{-1} B_p \tag{8}$$

The disturbance can be estimated from the prediction error $\tilde{x}(z)$ and the inversion of the transfer function $H_{d2pe}(z)$.

$$\hat{d}(z) = \frac{1}{H_{d2pe}(z)} \tilde{x}(z) \tag{9}$$

The system $H_{d2pe}(z)$ may be a non-minimum phase system (has unstable zero) because the VCM plant $C_p[zI - A_p]^{-1}B_p$ is a non-minimum phase system due to the effect of control delay. The system $H_{d2pe}(z)$ is also a proper system. For example, the transfer function can be defined as:

$$H_{d2pe}(z) = \frac{C_p adj(zI - A_p)B_p}{\det(zI - A_p + A_p L_p C_p)} \tag{10}$$

$$= \frac{K_0(z - \beta_{stable})(z - \beta_{unstable})}{z^3 + \alpha_1 z^2 + \alpha_2 z + \alpha_3}$$

where $|\beta_{stable}| < 1 < |\beta_{unstable}|$. The inversion $1/H_{d2pe}(z)$ is unstable and unrealizable. In order to find a stable and realizable inverse, a non-minimum phase system $H_{d2pe}(z)$ is decomposed into a minimum phase system and an all pass system.

$$H_{d2pe}(z) = H_{min}(z) H_{allpass}(z) \tag{11}$$

$$H_{min}(z) = \frac{-\beta_{unstable} K_0(z - \beta_{stable})\left(z - \frac{1}{\beta_{unstable}}\right)}{z^3 + \alpha_1 z^2 + \alpha_2 z + \alpha_3}$$

$$H_{allpass}(z) = \frac{-(z - \beta_{unstable})}{\beta_{unstable}\left(z - \frac{1}{\beta_{unstable}}\right)}$$

The minimum phase system of two systems is inversed to create a stable inversion filter which takes the following form:

$$H_{inv}(z) = \frac{1}{H_{min}(z)} \frac{1-a}{z-a} \tag{12}$$

$$= \frac{(1-a)(z^3 + \alpha_1 z^2 + \alpha_2 z + \alpha_3)}{-\beta_{unstable} K_0(z - \beta_{stable})\left(z - \frac{1}{\beta_{unstable}}\right)(z-a)}$$

The addition of the first order low pass filter $(1-a)/(z-a)$ makes the inversion filter a realizable system. An estimate of disturbance d is determined by passing the prediction error through the inversion filter.

$$\hat{d}(z) = H_{inv}(z)\tilde{x}(z) \quad (13)$$

The disturbance estimate may be corrupted by high-frequency noise because of VCM plant uncertainty including high-frequency flexible modes. External vibration is typically present in a low frequency area (below 900 Hz). In one embodiment, a $6^{th}$ order low pass filter is used to remove the unwanted high-frequency component.

$$H_{lpf}(z) = \left(\frac{c_1 z + d_1}{z^2 + a_1 z + b_1}\right)\left(\frac{c_2 z + d_2}{z^2 + a_2 z + b_2}\right)\left(\frac{c_3 z + d_3}{z^2 + a_3 z + b_3}\right) \quad (14)$$

Figure 4:
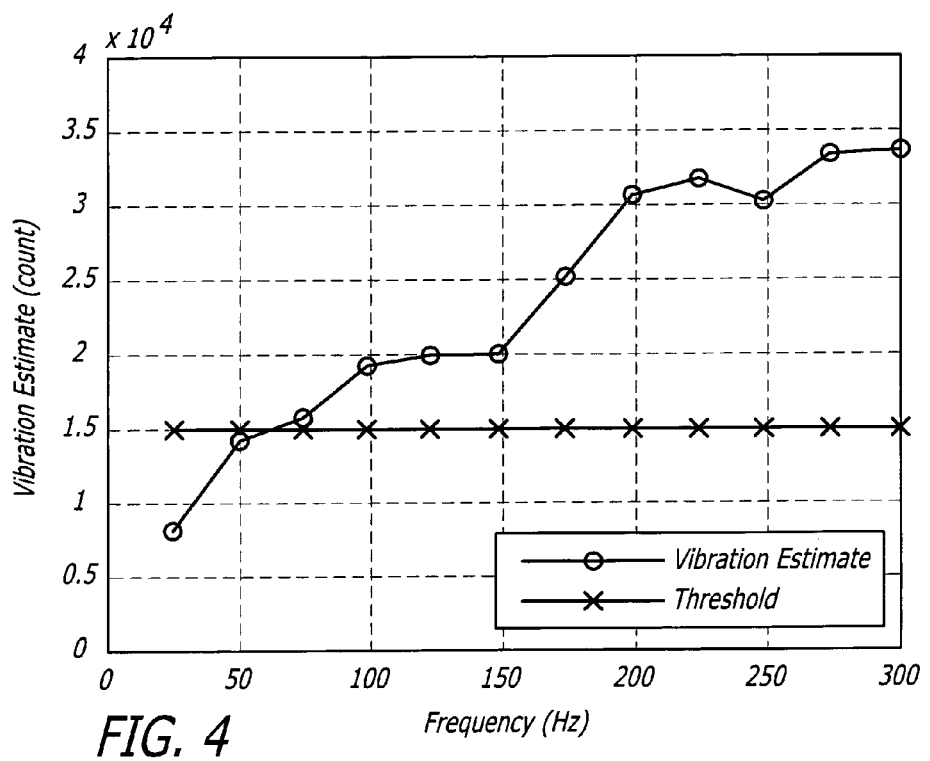
FIG. 4 is a graph showing an integrated vibration estimate signal compared with a threshold.

FIG. 4 shows an example of a vibration estimate versus a threshold value. The vibration estimate exceeds the threshold at about 60 Hz. At this point vibration is detected and the estimate d̂ is combined with the control signal u to compensate for the vibration.

Figure 5:
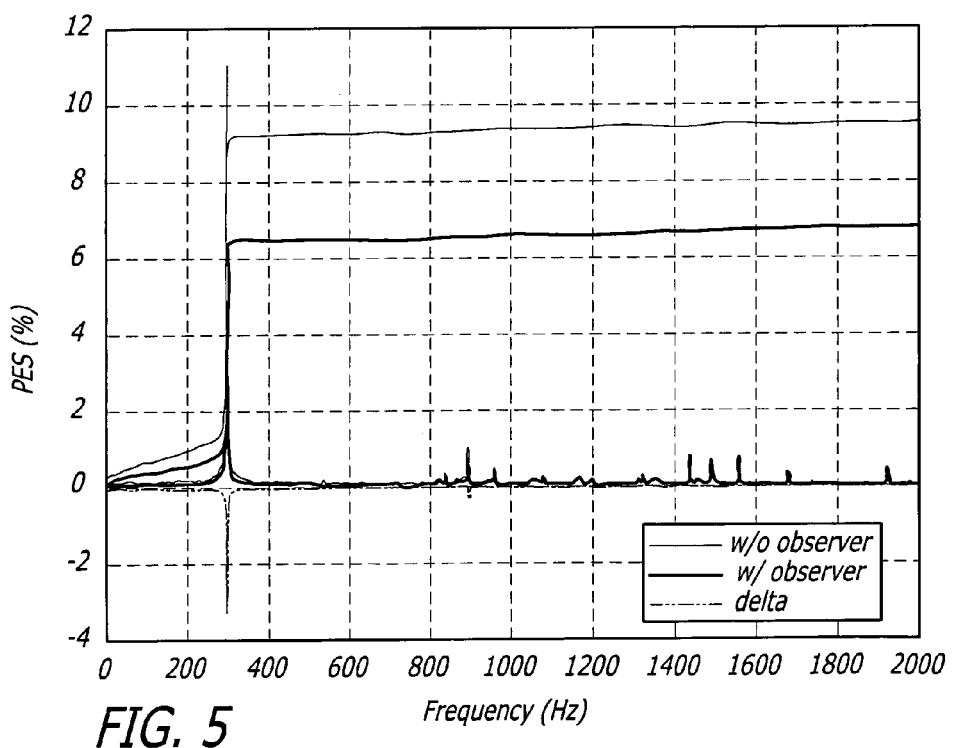
FIG. 5 is a graph showing a position error signal with and without the vibration detection of the present invention.

FIG. 5 shows a reduction in the position error signal (PES) with the detection technique described and shown versus a disk drive without vibration detection.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk;
   an actuator arm coupled to said head;
   a voice coil motor coupled to said actuator arm; and,
   a circuit that provides a control signal to said voice coil motor to move said head across said disk, said circuit includes a state predictor and an inversion filter that compute a vibration estimate used to detect a vibration, said circuit includes a comparator that compares said vibration estimate with a threshold and said vibration estimate is combined with said control signal if said vibration estimate exceeds the threshold.

2. The hard disk drive of claim 1, wherein said vibration estimate is combined with said control signal when the vibration is detected.

3. The hard disk drive of claim 1, wherein said circuit includes an integrator that integrates said vibration estimate.

4. The hard disk drive of claim 1, wherein said circuit includes a low pass filter that filters said vibration estimate.

5. The hard disk drive of claim 4, wherein said low pass filter is a sixth order filter.

6. The hard disk drive of claim 1, wherein said circuit includes a controller.

7. A hard disk drive, comprising:
   a disk;
   a head coupled to said disk;
   an actuator arm coupled to said head;
   a voice coil motor coupled to said actuator arm; and,
   circuit means for providing a control signal to said voice coil motor to move said head across said disk, and detecting a vibration.

8. The hard disk drive of claim 7, wherein said circuit means provides a vibration estimate that is combined with said output signal when the vibration is detected.

9. The hard disk drive of claim 8, wherein said circuit means compares said vibration estimate with a threshold and said vibration estimate is combined with the control signal if said vibration estimate exceeds the threshold.

10. The hard disk drive of claim 9, wherein said circuit means integrates said vibration estimate.

11. The hard disk drive of claim 8, wherein said circuit means low-pass filters said vibration estimate.

12. The hard disk drive of claim 11, wherein said vibration estimate is filtered with a sixth order filter.

13. The hard disk drive of claim 7, wherein said circuit means includes a controller.

14. A method for detecting a vibration in a hard disk drive, comprising:
   detecting a head position;
   computing a prediction error from the head position;
   computing a vibration estimate by passing the prediction error through an inversion filter; and,
   determining the vibration from the vibration estimate by comparing the vibration estimate with a threshold.

15. The method of claim 14, further comprising integrating the vibration estimate before comparing the vibration estimate with the threshold.

16. The method of claim 14, further comprising filtering the vibration estimate before comparing the vibration estimate with the threshold.

* * * * *